No. 701,703. Patented June 3, 1902.
C. FRANKISH.
FASTENER FOR HOSE COUPLINGS.
(Application filed Aug. 14, 1901.)
(No Model.)
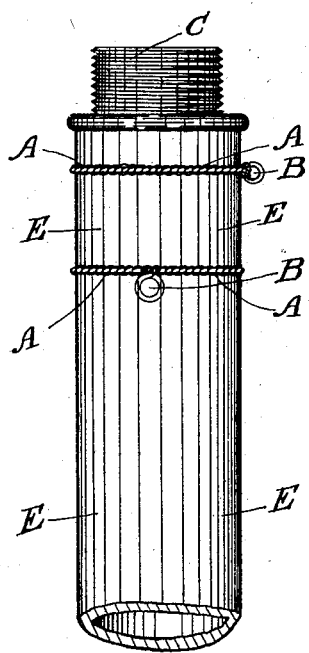
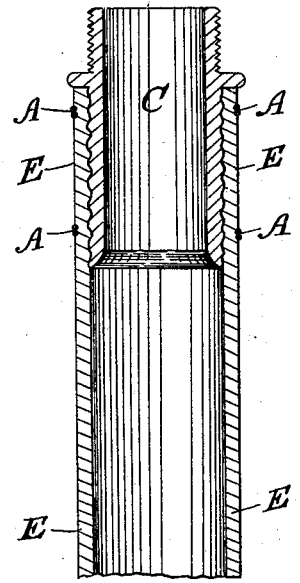
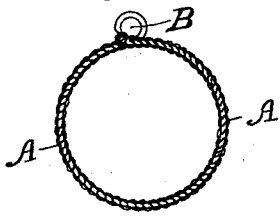
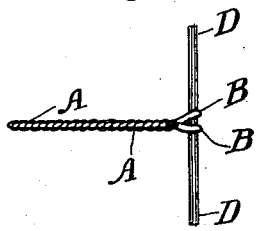
WITNESSES:
INVENTOR
Charles Frankish
BY St John Day
ATTORNEY

UNITED STATES PATENT OFFICE.

CHARLES FRANKISH, OF ONTARIO, CALIFORNIA.

FASTENER FOR HOSE-COUPLINGS.

SPECIFICATION forming part of Letters Patent No. 701,703, dated June 3, 1902.

Application filed August 14, 1901. Serial No. 72,041. (No model.)

*To all whom it may concern:*

Be it known that I, CHARLES FRANKISH, of Ontario, in the county of San Bernardino, State of California, have invented a certain new or Improved Fastening Device for Securely Holding Couplings in Flexible Hose, of which the following is a full, clear, and exact description or specification, reference being had to the accompanying sheet of drawings and to the letters marked thereon.

My said invention, which relates to a new or improved fastening device for securely holding a coupling-piece usually made of metal within the end or ends of lengths or sections of flexible pipe, commonly designated "hose," has for its object not only to provide a most effective fastening together of the parts, but it has also for its object to admit of the fastening being readily tightened from time to time whenever the parts shall, as they sometimes do, become loosened through the yielding of the fastening itself or the yielding of the material of which the hose itself is constructed or by the yielding of both the fastening and the material of the hose, so that the fastening becomes more or less loosened upon the hose itself.

My invention has also for its object to provide an exceedingly inexpensive fastener which, with the means used for fastening it upon the parts to be united, is easily carried at all times in the pocket of any person having occasion to use the same and this without the use of any other tool or instrument than a piece of stiff wire of iron, steel, brass, or other suitable metal.

Upon the annexed sheet of drawings, Figure 1 is a detached plan view of a fastener constructed according to my present invention. Fig. 2 is a plan of said fastener, showing the same bent or curved into circular form in readiness to be placed around the end portion or portions of a flexible pipe whereinto a coupling or couplings is or are to be fastened. Fig. 3 is a side elevation of my improved fastener shown in readiness for being tightened upon the flexible pipe and corresponding to Fig. 2. Fig. 4 is a vertical section of a piece of flexible pipe and section of a metallic coupling placed therein to be fastened or screwed thereinto by the fastener constituting my present invention. Fig. 5 is an elevation of a piece of flexible pipe with the metallic coupling also shown therein in elevation and also showing two of my improved fasteners tightened around the flexible pipe for the purpose of holding the coupling therein.

In Figs. 1, 2, and 3 of the drawings the fastener A is shown as consisting of wire which for the greater part of its length is twisted upon itself and having an open loop B of said wire left at either end thereof. The fastener is made from ordinary metal wire of strength suitable for the purpose for which the fastener is intended to be used, and in order to construct said fastener two ends of the piece of wire of which it is constructed are soldered together, when a bar or strip of metal, such as a piece of wire, is placed within either end of the wire loop, and which pieces of metal being twisted in opposite directions cause the whole of the loop of wire between the ends thereof to become twisted together in the manner shown at Figs. 1, 2, and 3, whereby two small loops become permanently formed at the opposite ends of each such fastener. When it is desired to apply such fastener for securing a coupling within the end of a flexible pipe or hose used for conveying water for watering or sprinkling lawns or gardens and for analogous purposes, each such fastener is bent around into circular form, as shown in Fig. 2, until each loop B B at the ends thereof becomes superposed, as shown at Figs. 2 and 3, so that when placed upon or around the exterior of the flexible hose having the coupling C within it, as shown at Figs. 4 and 5, by placing a piece of stout wire D, as shown at Fig. 3, within the end loops B B and by twisting the wire D D in such wise as to cause the ends of the fastener A A to become twisted upon each other each such fastener so twisted becomes tightened to any desired extent upon the flexible pipe or hose E, Figs. 4 and 5, until the coupling C is securely tightened within the end of the flexible pipe or hose E E. In fastening the coupling C within the end of a flexible pipe or hose E, as shown at Figs. 4 and 5, either one or more of such fasteners may be used. In Figs. 4 and 5 of the annexed drawings I have shown two such fasteners A as applied for fastening or securing a coupling within the end of the flexible pipe or hose E E. When each such fastener A A is securely tightened upon the flexible pipe or hose E E in the manner hereinbefore described, the loops B B thereof are or may be bent over so as to lie flat against the exterior of the flexible pipe or hose E E, and when it is required to tighten in such fastener A then the loops B B are or may be bent outward from the exterior surface of the flexible pipe-hose E E to admit of a piece of stout wire being passed through said loops B B for the purpose of again twisting, and thereby again tightening, the fastener A.

Although I have on the annexed drawings shown and in the preceding parts of this specification have described my new or improved fastener as consisting of wire whose ends are soldered together and the loop thereby formed being twisted into the fastener hereinbefore described and referred to, I desire it to be understood that my invention is not confined to constructing my improved fastener of wire, as my improved fastener may be constructed of loops of sheet metal stamped or cut of the requisite shape with a loop or eye at either end thereof for admitting of a stout wire being placed through said loops or eyes for the purpose of twisting, and thereby tightening, my said fastener upon the flexible pipe or hose wherein my fastener is used for securely holding a coupling therein, and that my said invention is intended to be constructed and used in accordance with the scope of the following claim.

Having now described the nature of my said invention and the best system, mode, or manner in and under which the same is or may be carried into practical effect, I desire to observe in conclusion that what I consider to be novel and original, and therefore claim as the invention to be secured to me by Letters Patent, is as follows:

The fastener consisting of a metallic strip or binder of sufficient length to encircle a flexible pipe or hose whereinto a coupling is to be fastened, and having a closed loop at each end thereof, which loops when said fastener is bent around the flexible pipe or hose to be coupled are superposed, so as to admit of a sufficiently stout piece of wire or rod being passed through said loops or eyes, whereby, on twisting said wire or rod, the under portions of the fastener become twisted and tightened upon each other to any extent requisite for securely holding a coupling within the end of a flexible pipe or hose in the manner and for the purposes substantially as hereinbefore described.

In testimony whereof I, the said CHARLES FRANKISH, have hereunto set my hand and seal, this 16th day of July, 1901, in the presence of two subscribing witnesses.

CHARLES FRANKISH. [L. S.]

Witnesses:
ST. JOHN DAY,
WILLIAM E. MURRAY.